(12) United States Patent
Liao et al.

(10) Patent No.: US 7,587,348 B2
(45) Date of Patent: Sep. 8, 2009

(54) SYSTEM AND METHOD OF DETECTING MORTGAGE RELATED FRAUD

(75) Inventors: Yuansong Liao, San Diego, CA (US); Jacob Spoelstra, Carlsbad, CA (US); James C. Baker, Bremerton, WA (US)

(73) Assignee: Basepoint Analytics LLC, Carlsbad, CA (US)

( * ) Notice: Subject to any disclaimer, the term of this patent is extended or adjusted under 35 U.S.C. 154(b) by 134 days.

(21) Appl. No.: 11/526,208

(22) Filed: Sep. 22, 2006

(65) Prior Publication Data

US 2007/0226129 A1 Sep. 27, 2007

Related U.S. Application Data

(60) Provisional application No. 60/831,788, filed on Jul. 18, 2006, provisional application No. 60/785,902, filed on Mar. 24, 2006.

(51) Int. Cl.
*G06Q 30/00* (2006.01)

(52) U.S. Cl. .............................. 705/35; 705/38; 705/39; 705/42; 705/44

(58) Field of Classification Search .................... 705/35
See application file for complete search history.

(56) References Cited

U.S. PATENT DOCUMENTS

| | | | |
|---|---|---|---|
| 5,819,226 A | 10/1998 | Gopinathan et al. | |
| 6,134,532 A | 10/2000 | Lazarus et al. | |
| 6,330,546 B1 * | 12/2001 | Gopinathan et al. | 705/35 |
| 6,430,539 B1 | 8/2002 | Lazarus et al. | |
| 6,728,695 B1 | 4/2004 | Pathria et al. | |
| 6,839,682 B1 | 1/2005 | Blume et al. | |
| 7,165,037 B2 | 1/2007 | Lazarus et al. | |
| 2002/0133371 A1 * | 9/2002 | Cole | 705/1 |
| 2002/0133721 A1 * | 9/2002 | Adjaoute | 713/201 |
| 2002/0194119 A1 | 12/2002 | Wright et al. | |

(Continued)

FOREIGN PATENT DOCUMENTS

CA 1252566 4/1989

(Continued)

OTHER PUBLICATIONS

"Fraud Detection in the Financial Industry", A SAS Institute Best Practices Paper, 32 pages.

(Continued)

*Primary Examiner*—James P Trammell
*Assistant Examiner*—Hai Tran
(74) *Attorney, Agent, or Firm*—Knobbe, Martens, Olson & Bear LLP (57) ABSTRACT

Embodiments include systems and methods of detecting fraud. In particular, one embodiment includes a system and method of detecting fraud in mortgage applications. For example, one embodiment includes a computerized method of detecting fraud that includes receiving mortgage data associated with an applicant and at least one entity related to processing of the mortgage data, determining a first score for the mortgage data based at least partly on a first model that is based on data from a plurality of historical mortgage transactions associated with the entity, and generating data indicative of fraud based at least partly on the first score. Other embodiments include systems and method of generating models for use in fraud detection systems.

39 Claims, 8 Drawing Sheets

U.S. PATENT DOCUMENTS

| | | | |
|---|---|---|---|
| 2003/0093366 A1* | 5/2003 | Halper et al. | 705/38 |
| 2004/0236696 A1 | 11/2004 | Aoki et al. | |
| 2005/0108025 A1* | 5/2005 | Cagan | 705/1 |
| 2006/0149674 A1 | 7/2006 | Cook et al. | |

FOREIGN PATENT DOCUMENTS

| | | |
|---|---|---|
| CA | 2032126 | 8/1993 |
| CA | 2052033 | 1/1999 |
| EP | 1450321 A | 8/2004 |
| WO | WO/0177959 | 10/2001 |
| WO | WO 02/37219 A3 | 5/2002 |
| WO | WO/02/097563 A2 | 12/2002 |
| WO | WO 2007/002702 A2 | 1/2007 |

OTHER PUBLICATIONS

Garavaglia, Susan, "An Application of a Counter-Propagation Neural Network: Simulating the Standard & Poor's Corporate Bond Rating System", IEEE 1991, pp. 278-287.

Congressional Testimony of Chris Swecker, Assistant Director, Criminal Investigative Division, Federal Bureau of Investigation, before the House Financial Services Subcommittee on Housing and Community Opportunity, Oct. 7, 2004, 5 pages.

"New Business Uses for Neurocomputing", I/S Analyzer, Feb. 1990, vol. 28, No. 2, 15 pages.

Ghosh, Sushmito and Reilly, Douglas L., "Credit Card Fraud Detection with a Neural-Network", IEEE 1994, pp. 621-630.

Neal, Mark, Hunt, John and Timmis, Jon, "Augmenting an Artificial Immune Network", IEEE 1998, pp. 3821-3826.

Klimasauskas, Casimir C., "Neural Networks: A Short Course", PC AI, Nov./Dec. 1988, pp. 26-30.

Klimasauskas, Casimir C., "Applying Neural Networks Part 1: An Overview of the Series", PC AI, Jan. Feb. 1991, pp. 30-33.

Klimasauskas, Casimir C., "Applying Neural Networks Part 2: A Walk Through the Application Process", PC AI, Mar./Apr. 1991, pp. 27-34.

Klimasauskas, Casimir C., "Applying Neural Networks Part III: Training a Neural Network", PC AI, May/Jun. 1991, pp. 20-24.

Klimasauskas, Casimir C., "Applying Neural Networks Part IV: Improving Performance", PC AI Jul./Aug. 1991, pp. 34-41.

Klimasauskas, Casimir C., "Applying Neural Networks Part V: Integrating a Trained Network into an Application", PC AI Sep./Oct. 1991, pp. 36-41.

Klimasauskas, Casimir C., "Applying Neural Networks Part VI: Special Topics", PC AI Nov./Dec. 1991, pp. 46-49.

J. Killin. "Combatting credit card fraud with knowledge based systems." In Compsec 90 International. Elsevier Advanced Technology, Oxford, Oct. 1990.

Search Report for GB0705653.4 dated Jun. 22, 2007, 4 pages.

* cited by examiner

SYSTEM AND METHOD OF DETECTING MORTGAGE RELATED FRAUD

RELATED APPLICATIONS

This application claims the benefit of, and incorporates by reference in their entirety, U.S. provisional patent application No. 60/785,902, filed Mar. 24, 2006 and U.S. provisional patent application No. 60/831,788, filed on Jul. 18, 2006.

BACKGROUND OF THE INVENTION

1. Field of the Invention

The present invention relates to detecting fraud in financial transactions.

2. Description of the Related Technology

Fraud detection systems detect fraud in financial transactions. For example, a mortgage fraud detection system may be configured to analyze loan application data to identify applications that are being obtained using fraudulent application data.

However, existing fraud detection systems have failed to keep pace with the dynamic nature of financial transactions and mortgage application fraud. Moreover, such systems have failed to take advantage of the increased capabilities of computer systems. Thus, a need exists for improved systems and methods of detecting fraud.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include improved fraud detection in financial transactions such as mortgage applications.

One embodiment includes a computerized method of detecting fraud. The method includes receiving mortgage data associated with an applicant and at least one entity related to processing of the mortgage data. The method further includes determining a first score for the mortgage data based at least partly on a first model that is based on data from a plurality of historical mortgage transactions associated with the at least one entity. The method further includes generating data indicative of fraud based at least partly on the first score.

Another embodiment includes a system for detecting fraud. The system includes a storage configured to receive mortgage data associated with an applicant and at least one entity related to processing of the mortgage application. The system further includes a processor configured to determine a first score for the mortgage data based at least partly on a first model that is based on data from a plurality of historical mortgage transactions associated with at least one entity. The system further includes generate data indicative of fraud based at least partly on the first score.

Another embodiment includes a system for detecting fraud. The system includes means for storing mortgage data associated with an applicant and at least one entity related to processing of the mortgage data, means for determining a first score for the mortgage data based at least partly on a first model that is based on data from a plurality of historical mortgage transactions associated with at least one entity, and means for generating data indicative of fraud based at least partly on the first score.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

Existing fraud detection systems may use transaction data in addition to data related to the transacting entities to identify fraud. Such systems may operate in either batch (processing transactions as a group of files at periodic times during the day) or real time mode (processing transactions one at a time, as they enter the system). However, the fraud detection capabilities of existing systems have not kept pace with either the types of fraudulent activity that have evolved or increasing processing and storage capabilities of computing systems.

For example, it has been found that, as discussed with reference to some embodiments, fraud detection can be improved by using stored past transaction data in place of, or in addition to, summarized forms of past transaction data. In addition, in one embodiment, fraud detection is improved by using statistical information that is stored according to groups of individuals that form clusters. In one such embodiment, fraud is identified with reference to deviation from identified clusters. In one embodiment, in addition to data associated with the mortgage applicant, embodiments of mortgage fraud detection systems may use data that is stored in association with one or more entities associated with the processing of the mortgage transaction such as brokers, appraisers, or other parties to mortgage transactions. The entities may be real persons or may refer to business associations, e.g., a particular appraiser, or an appraisal firm. Fraud generally refers to any material misrepresentation associated with a loan application and may include any misrepresentation which leads to a higher probability for the resulting loan to default or become un-sellable or require discount in the secondary market.

Mortgages may include residential, commercial, or industrial mortgages. In addition, mortgages may include first, second, home equity, or any other loan associated with a real property. In addition, it is to be recognized that other embodiments may also include fraud detection in other types of loans or financial transactions.

Exemplary applications of fraud detection relate to credit cards, debit cards, and mortgages. Furthermore, various patterns may be detected from external sources, such as data available from a credit bureau or other data aggregator.

Figure 1:
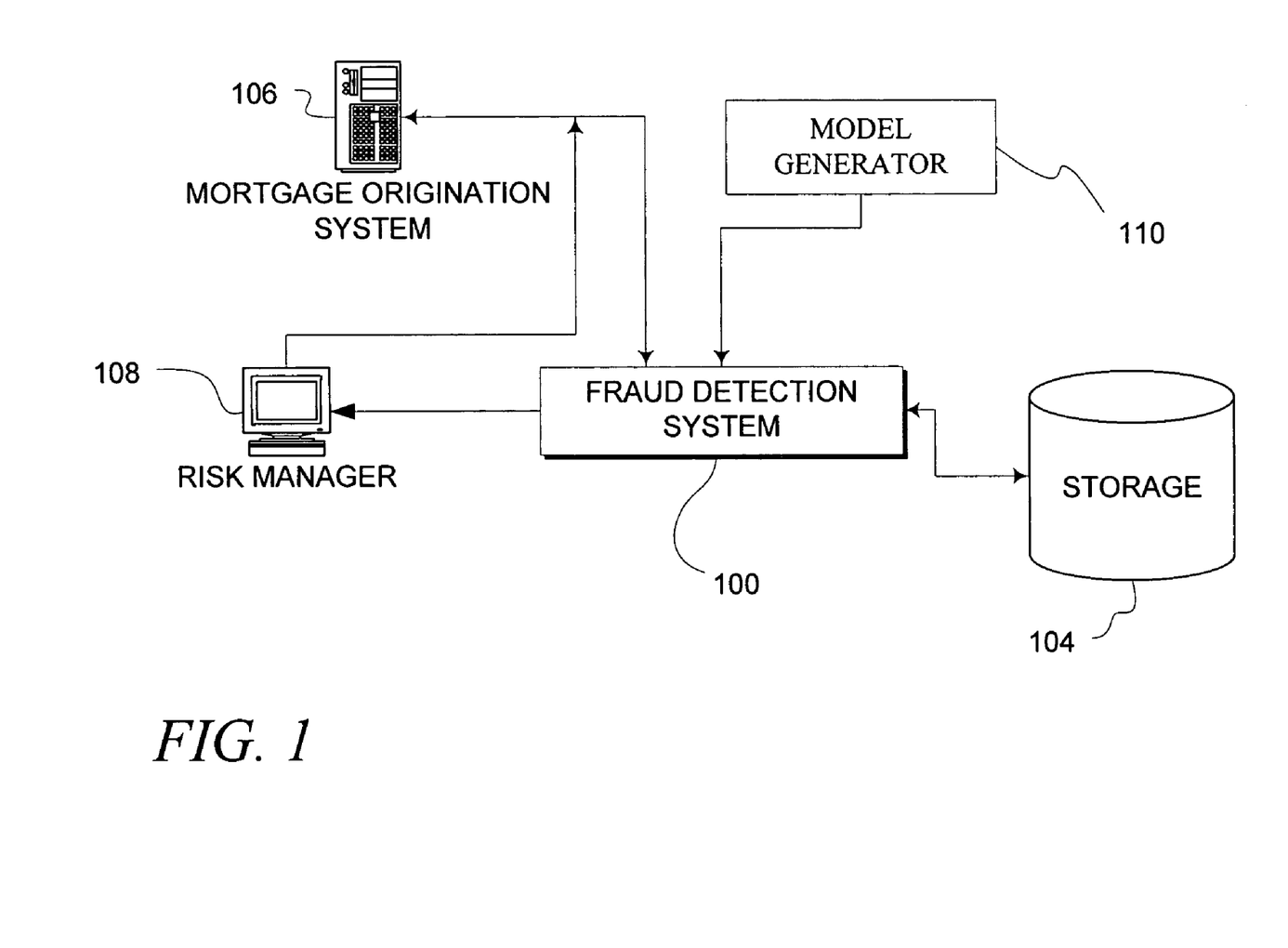
FIG. 1 is a functional block diagram illustrating a fraud detection system such as for use with a mortgage origination system.

FIG. 1 is a functional block diagram illustrating a fraud detection system 100 such as for use with a mortgage origination system 106. In other embodiments, the system 100 may be used to analyze applications for use in evaluating applications and/or funded loans by an investment bank or as part of due diligence of a loan portfolio. The fraud detection system 100 may receive and store data in a storage 104. The storage 104 may comprise one or more database servers and any suitable configuration of volatile and persistent memory. The fraud detection system 100 may be configured to receive mortgage application data from the mortgage origination system 106 and provide data indicative of fraud back to the mortgage origination system 106. In one embodiment, the fraud detection system 100 uses one or more models to generate the data indicative of fraud. In one embodiment, data indicative of fraud may also be provided to a risk manager system 108 for further processing and/or analysis by a human operator. The analysis system 108 may be provided in conjunction with the fraud detection system 100 or in conjunction with the mortgage origination system 106.

A model generator 110 may provide models to the fraud detection system 100. In one embodiment, the model generator 110 provides the models periodically to the system 100, such as when new versions of the system 100 are released to a production environment. In other embodiments, at least portion of the model generator 110 is included in the system 100 and configured to automatically update at least a portion of the models in the system 100.

Figure 2:
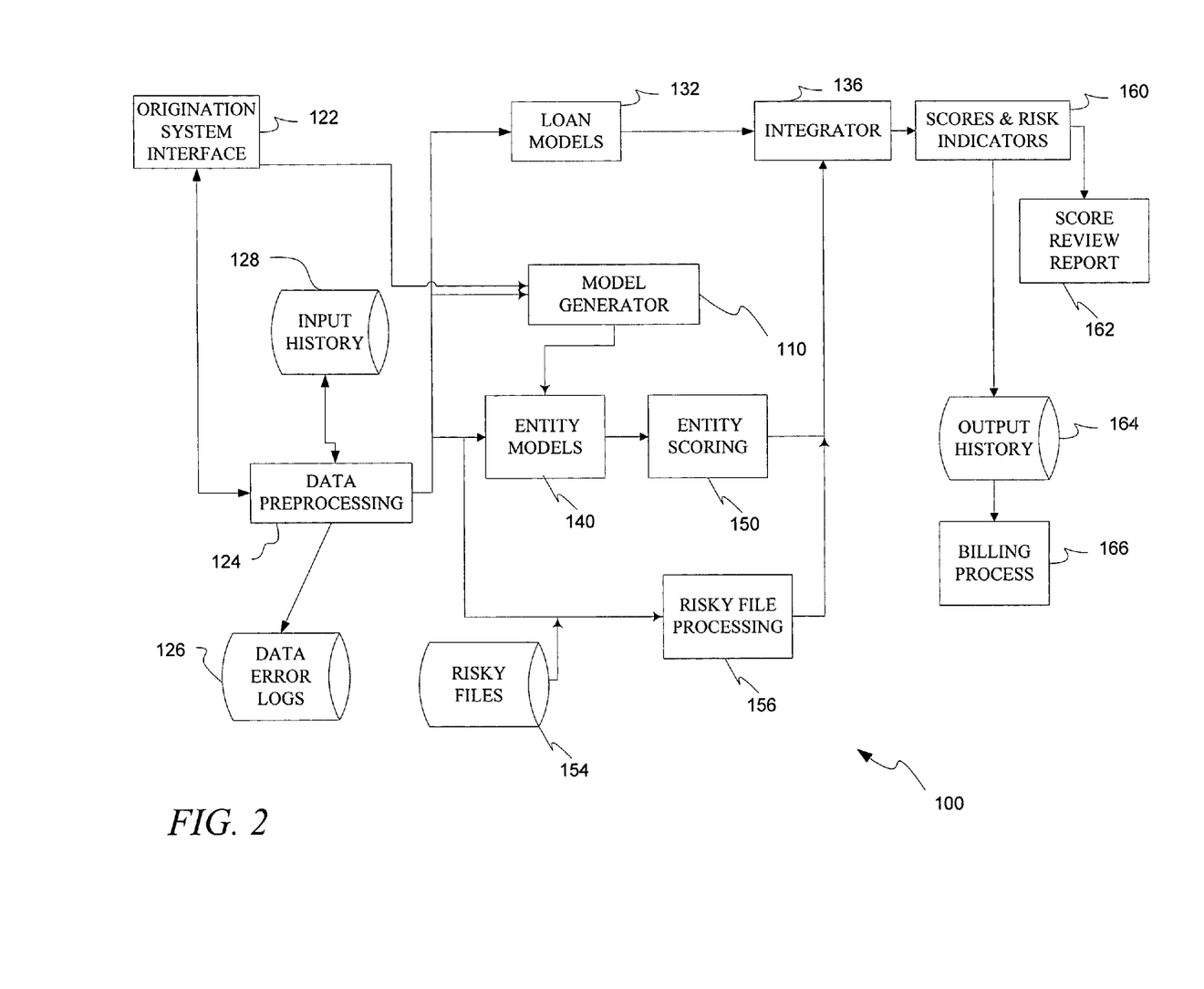
FIG. 2 is a functional block diagram illustrating an example of the fraud detection system of FIG. 1 in more detail.

FIG. 2 is a functional block diagram further illustrating an example of the fraud detection system 100. The system 100 may include an origination system interface 122 providing mortgage application data to a data preprocessing module 124. The origination system interface 122 receives data from the mortgage origination system 106 of FIG. 1. In other embodiments, the origination system interface 122 may be configured to receive data associated with funded mortgages and may be configured to interface with suitable systems other than, or in addition to, mortgage origination systems. For example, in one embodiment, the system interface 122 may be configured to receive "bid tapes" or other collections of data associated with funded mortgages for use in evaluating fraud associated with a portfolio of funded loans. In one embodiment the origination system interface 122 comprises a computer network that communicates with the origination system 106 to receive applications in real time or in batches. In one embodiment, the origination system interface 122 receives batches of applications via a data storage medium. The origination system interface 122 provides application data to the data preprocessing module 124 which formats application data into data formats used internally in the system 100. For example, the origination system interface 122 may also provide data from additional sources such as credit bureaus that may be in different formats for conversion by the data preprocessing module 124 into the internal data formats of the system 100. The origination system interface 122 and preprocessing module 124 also allow at least portions of a particular embodiment of the system 100 to be used to detect fraud in different types of credit applications and for different loan originators that have varying data and data formats. Table 1 lists examples of mortgage application data that may be used in various embodiments.

TABLE 1

Examples of Mortgage Data.

| Field Name | Field Description | Field Type |
|---|---|---|
| portfolio_id | Specifies which model was executed (TBD) | char |
| client_discretionary_field | Reserved for client use | char |
| loan_no | Unique Identifier for Loans | char |
| appl_date | Application Date | char |
| appraisal_value | Appraisal Value | float |
| borr_age | Borrower Age | long |
| borr_last_name | Borrower Last Name | char |
| borr_home_phone | Borrower Home Phone Internal Format: dddddddddd | char |
| borr_ssn | Borrower Social Security Number Internal Format: ddddddddd | char |
| coborr_last_name | Co-Borrower Last Name | char |
| coborr_ssn | Co-Borrower SSN Internal Format: ddddddddd | char |
| doc_type_code | Numeric Code For Documentation Type (Stated, Full, Partial, etc) Internal Mapping: 1: Full doc 3: Stated doc 4: Limited doc | char |
| credit_score | Credit Risk Score | long |
| loan_amount | Loan Amount | float |
| prop_zipcode | Five Digit Property Zip Code Internal Format: ddddd | char |
| status_desc | Loan Status | char |
| borr_work_phone | Borrower Business Phone Number Internal Format: dddddddddd | char |
| borr_self_employed | Borrower Self Employed Internal Mapping: | char |

TABLE 1-continued

Examples of Mortgage Data.

| Field Name | Field Description | Field Type |
|---|---|---|
| | Y: yes | |
| | N: no | |
| borr_income | Borrower Monthly Income | float |
| purpose_code | Loan Purpose (Refi or Purchase) Internal Mapping: 1: Purchase 1$^{st}$ 4: Refinance 1$^{st}$ 5: Purchase 2$^{nd}$ 6: Refinance 2$^{nd}$ | char |
| borr_prof_yrs | Borrower's Number of Years in this Profession | float |
| acct_mgr_name | Account Manager name | char |
| ae_code | Account Executive identifier (can be name or code) | char |
| category_desc | Category Description | char |
| loan_to_value | Loan to Value Ratio | float |
| combined_ltv | Combined Loan to Value Ratio | float |
| status_date | Status Date Format MMDDYYYY | char |
| borrower_employer | Borrower Employer's Name | char |
| borrower_first_name | Borrower first name | char |
| coborr_first_name | Co-Borrower first name | char |
| Borr_marital_status | Borrower marital status | char |
| mail_address | Borrower mailing street address | char |
| mail_city | Borrower mailing city | char |
| mail_state | Borrower mailing state | char |
| mail_zipcode | Borrower mailing address zipcode | char |
| prop_address | Property street address | char |
| prop_city | Property city | char |
| prop_state | Property state | char |
| Back_end_ratio | Back End Ratio | float |
| front_end_ratio | Front End Ratio | float |
| Appraiser Data | | |
| appr_code | Unique identifier for appraiser | char |
| appr_first_name | Appraiser first name | char |
| appr_last_name | Appraiser last name | char |
| appr_tax_id | Appraiser tax ID | char |
| appr_license_number | Appraiser License Number | char |
| appr_license_expiredate | Appraiser license expiration date | char |
| appr_license_state | Appraiser license state code | char |
| company_name | Appraiser company name | char |
| appr_cell_phone | Appraiser cell phone | char |
| appr_work_phone | Appraiser work phone | char |
| appr_fax | Appraiser fax number | char |
| appr_address | Appraiser current street address | char |
| appr_city | Appraiser current city | char |
| appr_state | Appraiser current state | char |
| appr_zipcode | Appraiser current zip code | char |
| appr_status_code | Appraiser status code (provide mapping) | char |
| appr_status_date | Date of appraiser's current status | char |
| appr_email | Appraiser e-mail address | char |
| Broker Data | | |
| brk_code | Broker Identifier | char |
| broker_first_name | Broker first name (or loan officer first name) | char |
| broker_last_name | Broker last name (or loan officer last name) | char |
| broker_tax_id | Broker tax ID | char |
| broker_license_number | Broker license number | char |
| broker_license_expiredate | Broker license expiration date | char |
| broker_license_state | Broker license state code | char |
| company_name | Broker company name | char |
| brk_cell_phone | Broker cell phone | char |
| brk_work_phone | Broker work phone | char |
| brk_fax | Broker fax number | char |
| brk_address | Broker current street address | char |
| brk_city | Broker current city | char |
| brk_state | Broker current state | char |
| brk_zipcode | Broker current zip code | char |
| brk_status_code | Broker status code (provide mapping) | char |
| brk_status_date | Date of broker's current status | char |
| brk_email | Broker e-mail address | char |
| brk_fee_amount | Broker fee amount | long |
| brk_point_amount | Broker point amount | long |
| program_type_desc | Program Type Description | char |
| loan_disposition | Final disposition of loan during application process: FUNDED - approved and funded NOTFUNDED - approved and not funded | char |

TABLE 1-continued

Examples of Mortgage Data.

| Field Name | Field Description | Field Type |
|---|---|---|
| | FRAUDDECLINE - confirmed fraud and declined<br>CANCELLED - applicant withdrew application prior to any risk evaluation or credit decision<br>PREVENTED - application conditioned for high risk/suspicion of misrepresentation and application was subsequently withdrawn or declined (suspected fraud but not confirmed fraud)<br>DECLINED - application was declined for non-fraudulent reasons (e.g. credit risk)<br>FUNDFRAUD - application was approved and funded and subsequently found to be fraudulent in post-funding QA process | |

The preprocessing module 124 may be configured to identify missing data values and provide data for those missing values to improve further processing. For example, the preprocessing module 124 may generate application data to fill missing data fields using one or more rules. Different rules may be used depending on the loan data supplier, on the particular data field, and/or on the distribution of data for a particular field. For example, for categorical fields, the most frequent value found in historical applications may be used. For numerical fields, the mean or median value of historical applications may be used. In addition, other values may be selected such as a value that is associated with the highest risk of fraud (e.g., assume the worst) or a value that is associated with the lowest risk of fraud (e.g., assume the best). In one embodiment, a sentinel value, e.g., a specific value that is indicative of a missing value to one or more fraud models may be used (allowing the fact that particular data is missing to be associated with fraud).

The preprocessing module 124 may also be configured to identify erroneous data or missing data. In one embodiment, the preprocessing module 124 extrapolates missing data based on data from similar applications, similar applicants, or using default data values. The preprocessing module 124 may perform data quality analysis such as one or more of critical error detection, anomaly detection, and data entry error detection. In one embodiment, applications failing one or more of these quality analyses may be logged to a data error log database 126.

In critical error detection, the preprocessing module 124 identifies applications that are missing data that the absence of which is likely to confound further processing. Such missing data may include, for example, appraisal value, borrower credit score, or loan amount. In one embodiment, no further processing is performed and a log or error entry is stored to the database 126 and/or provided to the loan origination system 106.

In anomaly detection, the preprocessing module 124 identifies continuous application data values that may be indicative of data entry error or of material misrepresentations. For example, high loan or appraisal amounts (e.g., above a threshold value) may be indicative of data entry error or fraud. Other anomalous data may include income or age data that is outside selected ranges. In one embodiment, such anomalous data is logged and the log provided to the origination system 106. In one embodiment, the fraud detection system 100 continues to process applications with anomalous data. The presence of anomalous data may be logged to the database 126 and/or included in a score output or report for the corresponding application.

In data entry detection, the preprocessing module 124 identifies non-continuous data such as categories or coded data that appear to have data entry errors. For example, telephone numbers or zip codes that have too many or too few digits, incomplete social security numbers, toll free numbers as home or work numbers, or other category data that fails to conform to input specifications may be logged. The presence of anomalous data may be logged to the database 126 and/or included in a score output or report for the corresponding application.

In one embodiment, the preprocessing module 124 queries an input history database 128 to determine if the application data is indicative of a duplicate application. A duplicate may indicate either resubmission of the same application fraudulently or erroneously. Duplicates may be logged. In one embodiment, no further processing of duplicates is performed. In other embodiments, processing of duplicates continues and may be noted in the final report or score. If no duplicate is found, the application data is stored to the input history database 124 to identify future duplicates.

The data preprocessing module 124 provides application data to one or more models for fraud scoring and processing. In one embodiment, application data is provided to one or more loan models 132 that generate data indicative of fraud based on application and applicant data. The data indicative of fraud generated by the loan models 132 may be provided to an integrator 136 that combines scores from one or more models into a final score. The data preprocessing module 124 may also provide application data to one or more entity models 140 that are configured to identify fraud based on data associated with entities involved in the processing of the application. Entity models may include models of data associated with loan brokers, loan officers or other entities involved in a loan application. More examples of such entity models 140 are illustrated with reference to FIG. 4. Each of the entity models may output data to an entity scoring module 150 that is configured to provide a score and/or one or more risk indicators associated with the application data. The term "risk indicator" refers to data values identified with respect to one or more data fields that may be indicative of fraud. The entity scoring module 150 may provide scores associated with one or more risk indicators associated with the particular entity or application. For example, appraisal value in combination with zip code may be a risk indicator associated with an appraiser model. In one embodiment, the entity scoring module 150 provides scores and indicators to the integrator 136 to generate a combined fraud score and/or set of risk indicators.

In one embodiment, the selection of risk indicators are based on criteria such as domain knowledge, and/or correlation coefficients between entity scores and fraud rate, if entity fraud rate is available. Correlation coefficient $r_i$ between entity score $s^i$ for risk indicator i and entity fraud rate f is defined as $$r_i = \frac{\sum_{j=1}^{N}(s_j^i - \bar{s})(f_j - \bar{f})}{(N-1)SD(s^i)SD(f)}$$

where $s_j^i$ is the score for entity j on risk indicator i; and $f_j$ is the fraud rate for entity j. If $r_i$ is larger than a pre-defined threshold, then the risk indicator i is selected.

In one embodiment, the entity scoring model 150 combines each of the risk indicator scores for a particular entity using a weighted average or other suitable combining calculation to generate an overall entity score. In addition, the risk indicators having higher scores may also be identified and provided to the integrator 136.

In one embodiment, the combined score for a particular entity may be determined using one or more of the following models:

An equal weight average:

$$s_c = \frac{1}{N}\sum_{i=1}^{N}s^i,$$

where N is the number of risk indicators;
A weighted average:

$$s_c = \sum_{i=1}^{N}s^i\alpha^i,$$

where N is the number of risk indicators and $\alpha^i$ is estimated based on how predictive risk indicator i is on individual loan level; a A competitive committee:

$$s_c = \frac{1}{M}\sum_{i=1}^{M}s^i,$$

where $s^i \in$ (set of largest M risk indicator scores).

If entity fraud rate or entity performance data (EPD) rate is available, the fraud/EPD rate may be incorporated with entity committee score to generate the combined entity score. The entity score $S_E$ may be calculated using one of the following equations:

$S_E = S_C$, if relative entity fraud/EPD rate $\leq 1$;

$S_E = S_D + \min(\alpha^*\max(\text{absoluteFraudRate}, \text{absoluteEPDRate}), 0.99)(998 - S_D)$ if relative entity fraud/EPD rate>1 and $S_C < S_D$;

$S_E = S_C + \min(\alpha^*\max(\text{absoluteFraudRate}, \text{absoluteEPDRate}), 0.99)(998 - S_C)$ if relative entity fraud/EPD rate>1 and $S_C \geq S_D$;

where $\alpha = b * \tan h(a^*(\max(\text{relativeFraudRate}, \text{relativeEPDRate})-1))$ The preprocessing module 124 may also provide application data to a risky file processing module 156. In addition to application data, the risky file processing module 156 is configured to receive files from a risky files database 154. "Risky" files include portions of applications that are known to be fraudulent. It has been found that fraudulent applications are often resubmitted with only insubstantial changes in application data. The risky file processing module 156 compares each application to the risky files database 154 and flags applications that appear to be resubmissions of fraudulent applications. In one embodiment, risky file data is provided to the integrator 136 for integration into a combined fraud score or report.

The integrator 136 applies weights and/or processing rules to generate one or more scores and risk indicators based on the data indicative of fraud provided by one or more of the loan models 132, the entity models 140 and entity scoring modules 160, and the risky file processing module 156. In one embodiment, the risk indicator 136 generates a single score indicative of fraud along with one or more risk indicators relevant for the particular application. Additional scores may also be provided with reference to each of the risk indicators. The integrator 136 may provide this data to a scores and risk indicators module 160 that logs the scores to an output history database 160. In one embodiment, the scores and risk indicators module 160 identifies applications for further review by the risk manager 108 of FIG. 1. Scores may be real or integer values. In one embodiment, scores are numbers in the range of 1-999. In one embodiment, thresholds are applied to one or more categories to segment scores into high and low risk categories. In one embodiment, thresholds are applied to identify applications for review by the risk manager 108. In one embodiment, risk indicators are represented as codes that are indicative of certain data fields or certain values for data fields. Risk indicators may provide information on the types of fraud and recommended actions. For example, risk indicators might include a credit score inconsistent with income, high risk geographic area, etc. Risk indicators may also be indicative of entity historical transactions, e.g., a broker trend that is indicative of fraud.

A score review report module 162 may generate a report in one or more formats based on scores and risk indicators provided by the scores and risk indicators module 160. In one embodiment, the score review report module 162 identifies loan applications for review by the risk manager 108 of FIG. 1. One embodiment desirably improves the efficiency of the risk manager 108 by identifying applications with the highest fraud scores or with particular risk indicators for review thereby reducing the number of applications that need to be reviewed. A billing process 166 may be configured to generate billing information based on the results in the output history.

In one embodiment, the model generator 110 receives application data, entity data, and data on fraudulent and non-fraudulent applications and generates and updates models such as the entity models 140 either periodically or as new data is received.

Figure 3:
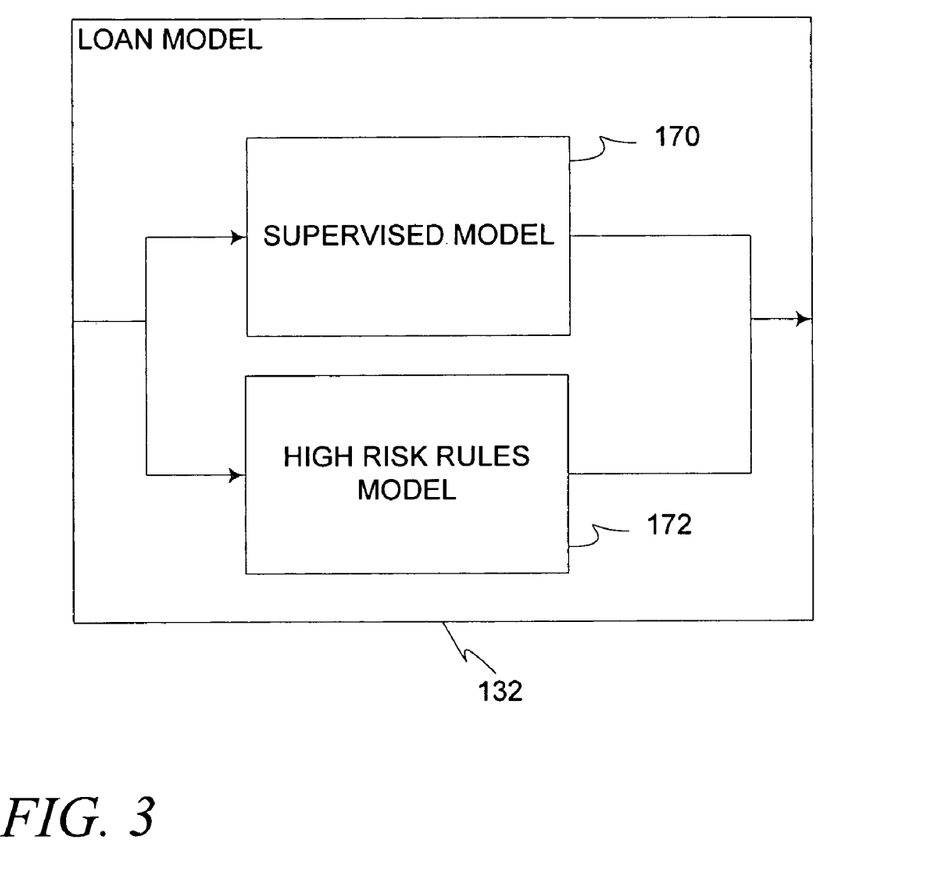
FIG. 3 is a functional block diagram illustrating an example of loan models in the fraud detection system of FIG. 2.

FIG. 3 is a functional block diagram illustrating an example of the loan models 132 in the fraud detection system 100. In one embodiment, the loan models 132 may include one or more supervised models 170 and high risk rules models 172. Supervised models 170 are models that are generated based on training or data analysis that is based on historical transactions or applications that have been identified as fraudulent or non-fraudulent. Examples of implementations of supervised models 170 include scorecards, naïve Bayesian, decision trees, logistic regression, and neural networks. Particular embodiments may include one or more such supervised models 170.

The high risk rules models 172 may include expert systems, decision trees, and/or classification and regression tree (CART) models. The high risk rules models 172 may include rules or trees that identify particular data patterns that are indicative of fraud. In one embodiment, the high risk rules models 172 is used to generate scores and/or risk indicators.

In one embodiment, the rules, including selected data fields and condition parameters, are developed using the historical data used to develop the loan model 170. A set of high risk rule models 172 may be selected to include rules that have low firing rate and high hit rate. In one embodiment, when a rule i is fired, it outputs a score: $S_{rule}^i$. The score represents the fraud risk associated to the rule. The score may be a function of $$S_{rule}^i = f(\text{hitRateOfRule}^i, \text{firingRateofRule}^i, \text{scoreDistributionOfLoanAppModel}),$$

and $S_{rule} = \max(S_{rule}^1 \ldots S_{rule}^N)$.

In one embodiment, the loan models 170 and 172 are updated when new versions of the system 100 are released into operation. In another embodiment, the supervised models 170 and the high risk rules models 172 are updated automatically. In addition, the supervised models 170 and the high risk rules models 172 may also be updated such as when new or modified data features or other model parameters are received.

Figure 4:
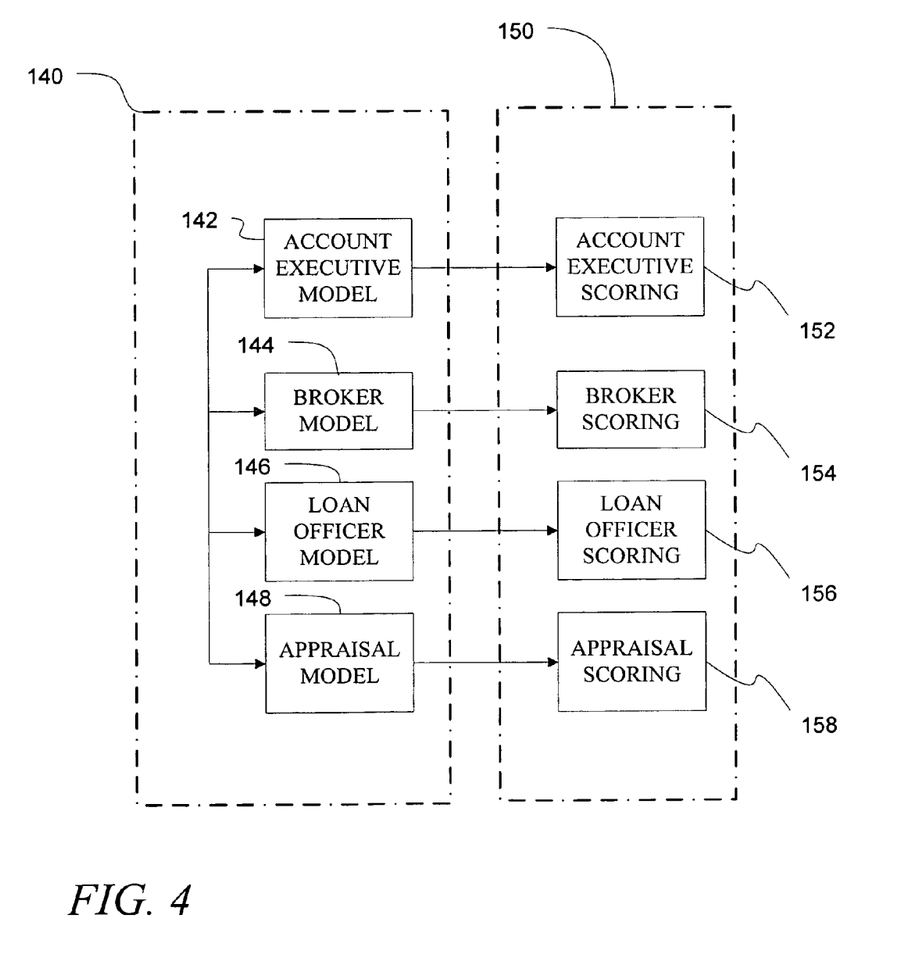
FIG. 4 is a functional block diagram illustrating examples of entity models in the fraud detection system of FIG. 2.

FIG. 4 is a functional block diagram illustrating examples of the entity models 140 in the fraud detection system 100. It has been found that fraud detection performance can be increased by including models that operate on entities associated with a mortgage transaction that are in addition to the mortgage applicant. Scores for a number of different types of entities are calculated based on historical transaction data. The entity models may include one or more of an account executive model 142, a broker model 144, a loan officer model 146, and an appraiser (or appraisal) model 148. Embodiments may also include other entities associated with a transaction such as the lender. For example, in one embodiment, an unsupervised model, e.g., a clustering model such as k-means, is applied to risk indicators for historical transactions for each entity. A score for each risk indicator, for each entity, is calculated based on the relation of the particular entity to the clusters across the data set for the particular risk indicator.

By way of a simple example, for a risk indicator that is a single value, e.g., loan value for a broker, the difference between the loan value of each loan of the broker and the mean (assuming a simple Gaussian distribution of loan values) divided by the standard deviation of the loan values over the entire set of historical loans for all brokers might be used as a risk indicator for that risk indicator score. Embodiments that include more sophisticated clustering algorithms such as k-means may be used along with multi-dimensional risk indicators to provide for more powerful entity scores.

The corresponding entity scoring module 150 for each entity (e.g., account executive scoring module 152, broker scoring module 154, loan officer scoring module 156, and appraisal scoring module 158) may create a weighted average of the scores of a particular entity over a range of risk indicators that are relevant to a particular transaction.

Figure 5:
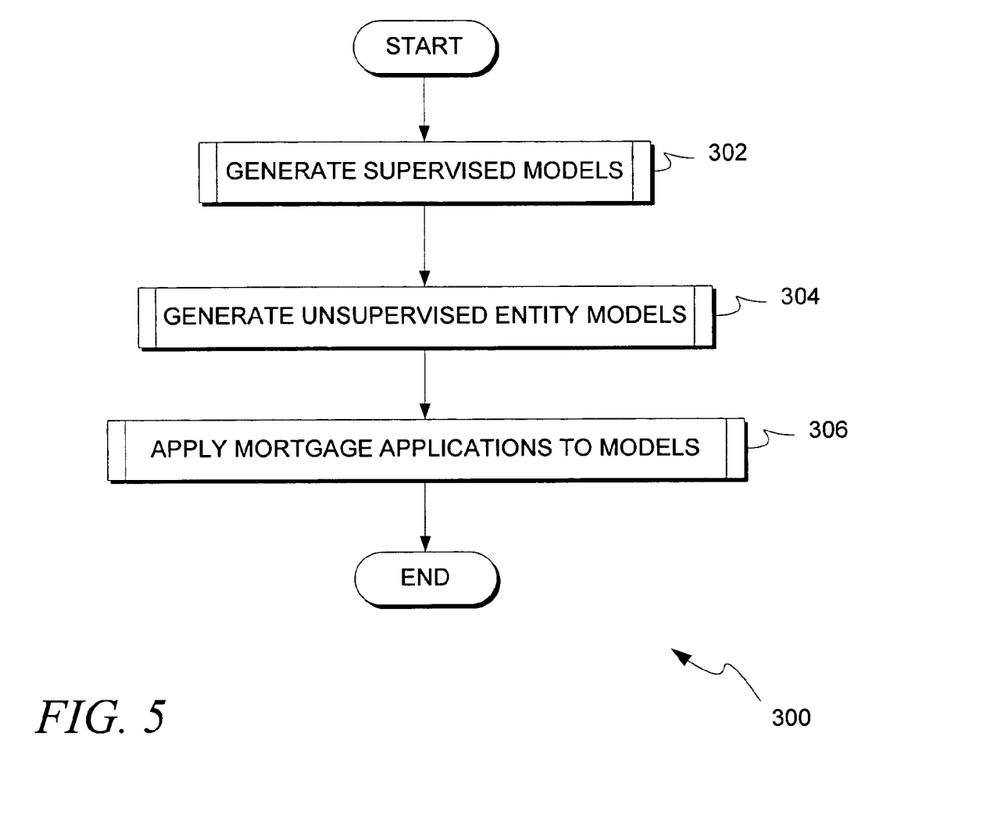
FIG. 5 is a flowchart illustrating model generation and use in the fraud detection system of FIG. 2.

FIG. 5 is a flowchart illustrating a method 300 of operation of the fraud detection system 100. The method 300 begins at a block 302 in which the supervised model is generated. In one embodiment, the supervised models 170 are generated based on training or data analysis that is based on historical transactions or applications that have been identified as fraudulent or non-fraudulent. Further details of generating supervised models are discussed with reference to FIG. 7. Moving to a block 304, the system 100 generates one or more unsupervised entity models such as the account executive model 142, the broker model 144, the loan officer model 146, or the appraiser (or appraisal) model 148. Further details of generating unsupervised models are discussed with reference to FIG. 8. Proceeding to a block 306, the system 100 applies application data to models such as supervised models 132 and entity models 150. The functions of block 306 may be repeated for each loan application that is to be processed. Further detail of applying data to the models is described with reference to FIG. 6.

In one embodiment, the model generator 110 generates and/or updates models as new data is received or at specified intervals such as nightly or weekly. In other embodiments, some models are updated continuously and others at specified intervals depending on factors such as system capacity, mortgage originator requirements or preferences, etc. In one embodiment, the entity models are updated periodically, e.g., nightly or weekly while the loan models are only updated when new versions of the system 100 are released into operation.

Figure 6:
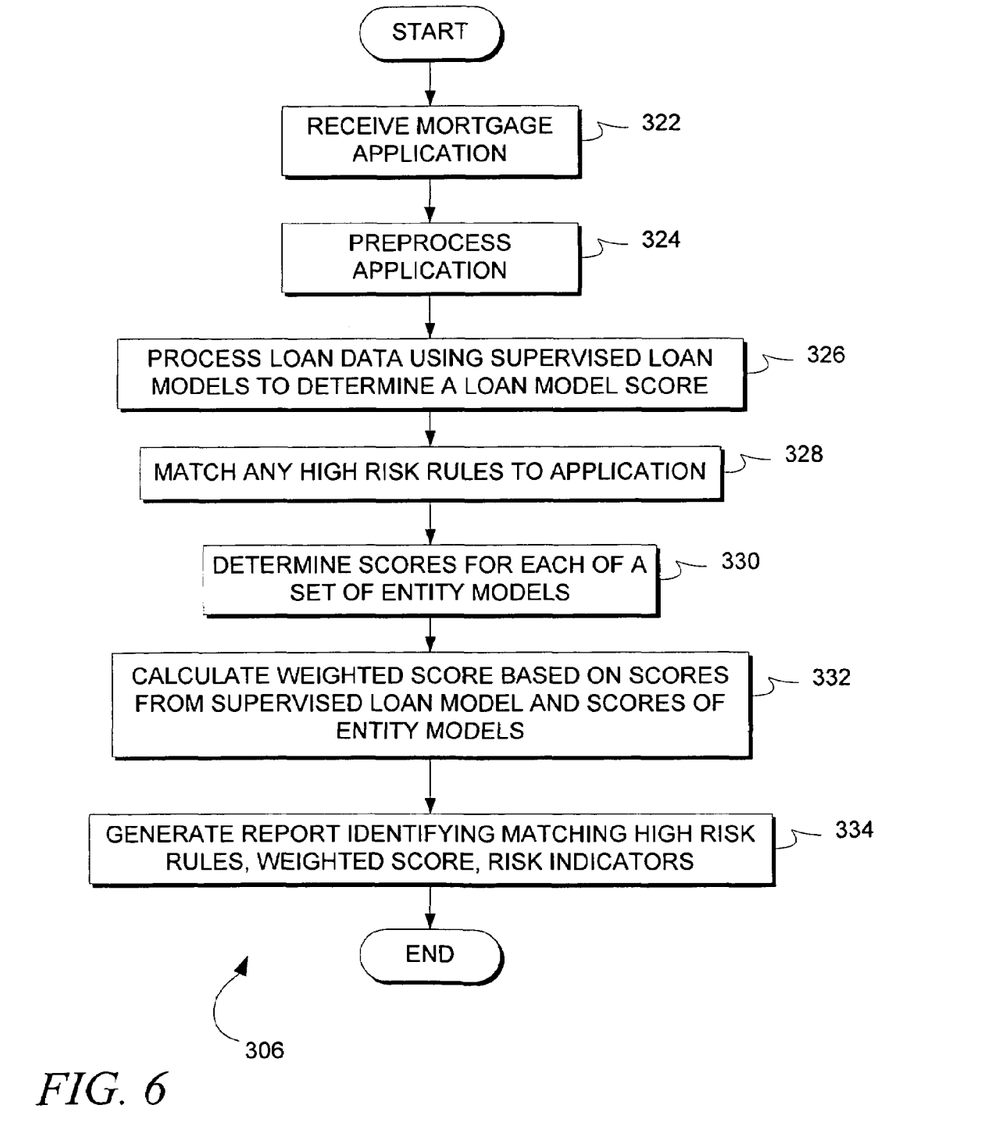
FIG. 6 is a flowchart illustrating an example of using models in the fraud detection system of FIG. 2.

FIG. 6 is a flowchart illustrating an example of a method of performing the functions of the block 306 of FIG. 5 of using models in the fraud detection system 100 to process a loan application. The function 306 begins at a block 322 in which the origination system interface 122 receives loan application data. Next at a block 324, the data preprocessing module 124 preprocesses the application 324 as discussed above with reference to FIG. 2.

Moving to a block 326, the application data is applied to the supervised loan models 170 which provide a score indicative of the relative likelihood or probability of fraud to the integrator 136. In one embodiment, the supervised loan models 170 may also provide risk indicators. Next at a block 328, the high risk rules model 172 is applied to the application to generate one or more risk indicators, and/or additional scores indicative of fraud. Moving to a block 330, the application data is applied to one or more of the entity models 140 to generate additional scores and risk indicators associated with the corresponding entities of the models 140 associated with the transaction.

Next at a block 332, the integrator 136 calculates a weighted score and risk indicators based on-scores and risk indicators from the supervised loan model 170, the high risk rules model 172, and scores of entity models 140. In one embodiment, the integrator 136 includes an additional model, e.g., a trained supervised model, that combines the various scores, weights, and risk factors provided by the models 170, 172, and 140.

Moving to a block 334, the scores and risk indicators module 160 and the score review report module 162 generate a report providing a weighted score along with one or more selected risk indicators. The selected risk indicators may include explanations of potential types of frauds and recommendations for action.

Figure 7:
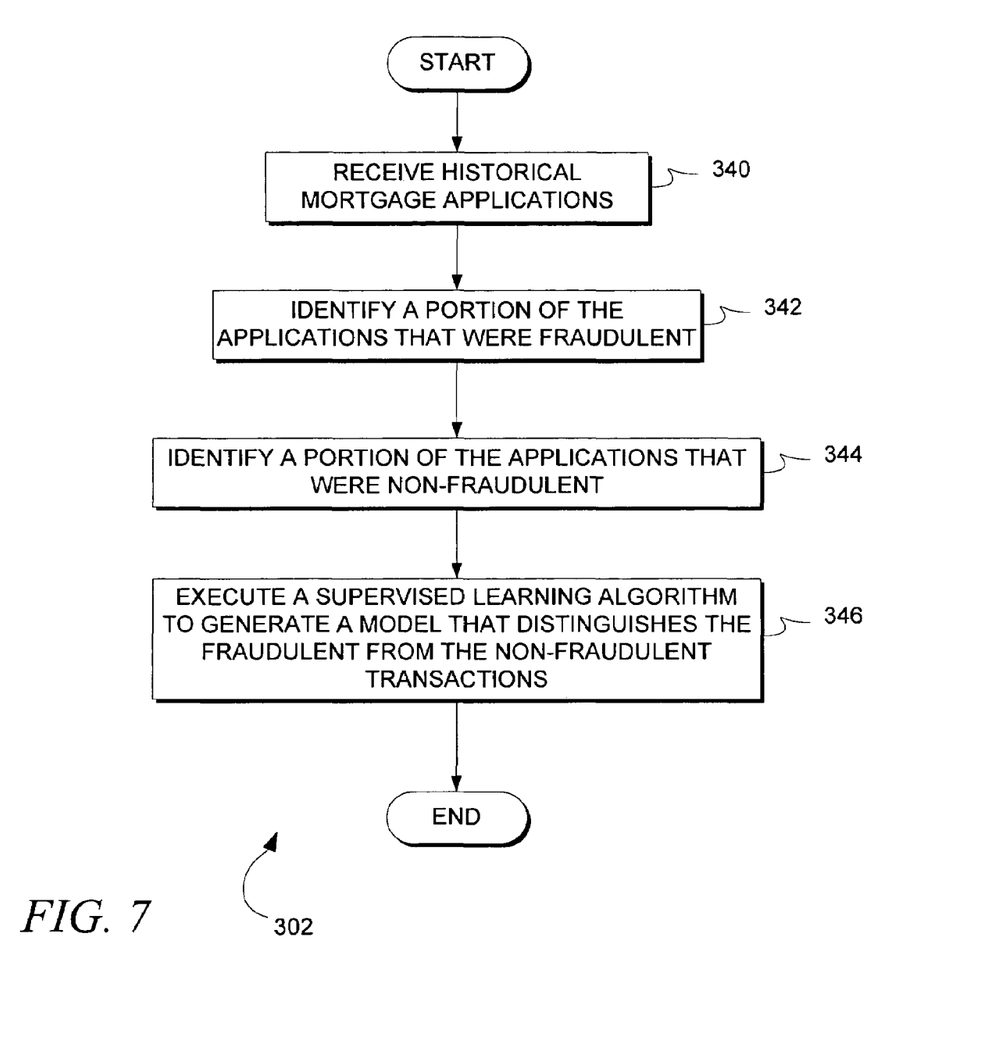
FIG. 7 is a flowchart illustrating an example of generating a loan model in the fraud detection system of FIG. 2.

FIG. 7 is a flowchart illustrating an example of a method of performing the block 302 of FIG. 5 of generating the loan models 132 in the fraud detection system 100. Supervised learning algorithms identify a relationship between input features and target variables based on training data. In one embodiment, the target variables comprise the probability of fraud. Generally, the models used may depend on the size of the data and how complex a problem is. For example, if the fraudulent exemplars in historical data are less than about 5000 in number, smaller and simpler models may be used, so a robust model parameter estimation can be supported by the data size. The method 302 begins at a block 340 in which the model generator 110 receives historical mortgage data. The model generator 110 may extract and convert client historical data according to internal development data specifications, perform data analysis to determine data quality and availability, and rectify anomalies, such as missing data, invalid data, or possible data entry errors similar to that described above with reference to preprocessing module 124 of FIG. 2.

In addition, the model generator 110 may perform feature extraction including identifying predictive input variables for fraud detection models. The model generator 110 may use domain knowledge and mathematical equations applied to single or combined raw input data fields to identify predictive features. Raw data fields may be combined and transformed into discriminative features. Feature extraction may be performed based on the types of models for which the features are to be used. For example, linear models such as logistic regression and linear regression, work best when the relationships between input features and the target are linear. If the relationship is non-linear, proper transformation functions may be applied to convert such data to a linear function. In one embodiment, the model generator 110 selects features from a library of features for use in particular models. The selection of features may be determined by availability of data fields, and the usefulness of a feature for the particular data set and problem. Embodiments may use techniques such as filter and wrapper approaches, including information theory, stepwise regression, sensitivity analysis, data mining, or other data driven techniques for feature selection.

In one embodiment, the model generator 110 may segment the data into subsets to better model input data. For example, if subsets of a data set are identified with significantly distinct behavior, special models designed especially for these subsets normally outperform a general fit-all model. In one embodiment, a prior knowledge of data can be used to segment the data for generation of models. For example, in one embodiment, data is segregated geographically so that, for example, regional differences in home prices and lending practices do not confound fraud detection. In other embodiments, data driven techniques, e.g., unsupervised techniques such as clustering, are used to identify data segments that may benefit from a separate supervised model.

Proceeding to a block 342, the model generator 110 identifies a portion of the applications in the received application data (or segment of that data) that were fraudulent. In one embodiment, the origination system interface 122 provides this labeling. Moving to a block 344, the model generator 110 identifies a portion of the applications that were non-fraudulent. Next at a block 346, the model generator 110 generates a model such as the supervised model 170 using a supervised learning algorithm to generate a model that distinguishes the fraudulent from the non-fraudulent transactions. In one embodiment, CART or other suitable model generation algorithms are applied to at least a portion of the data to generate the high risk rules models 172.

In one embodiment, historical data is split into multiple non-overlapped data sets. These multiple data sets are used for model generation and performance evaluation. For example, to train a neural network model, the data may be split into three sets, training set 1, training set 2, and validation. The training set 1 is used to train the neural network. The training set 2 is used during training to ensure the learning converge properly and to reduce overfitting to the training set 1. The validation set is used to evaluate the trained model performance. Supervised models may include one or more of scorecards, naïve Bayesian, decision trees, logistic regression, and neural networks.

Figure 8:
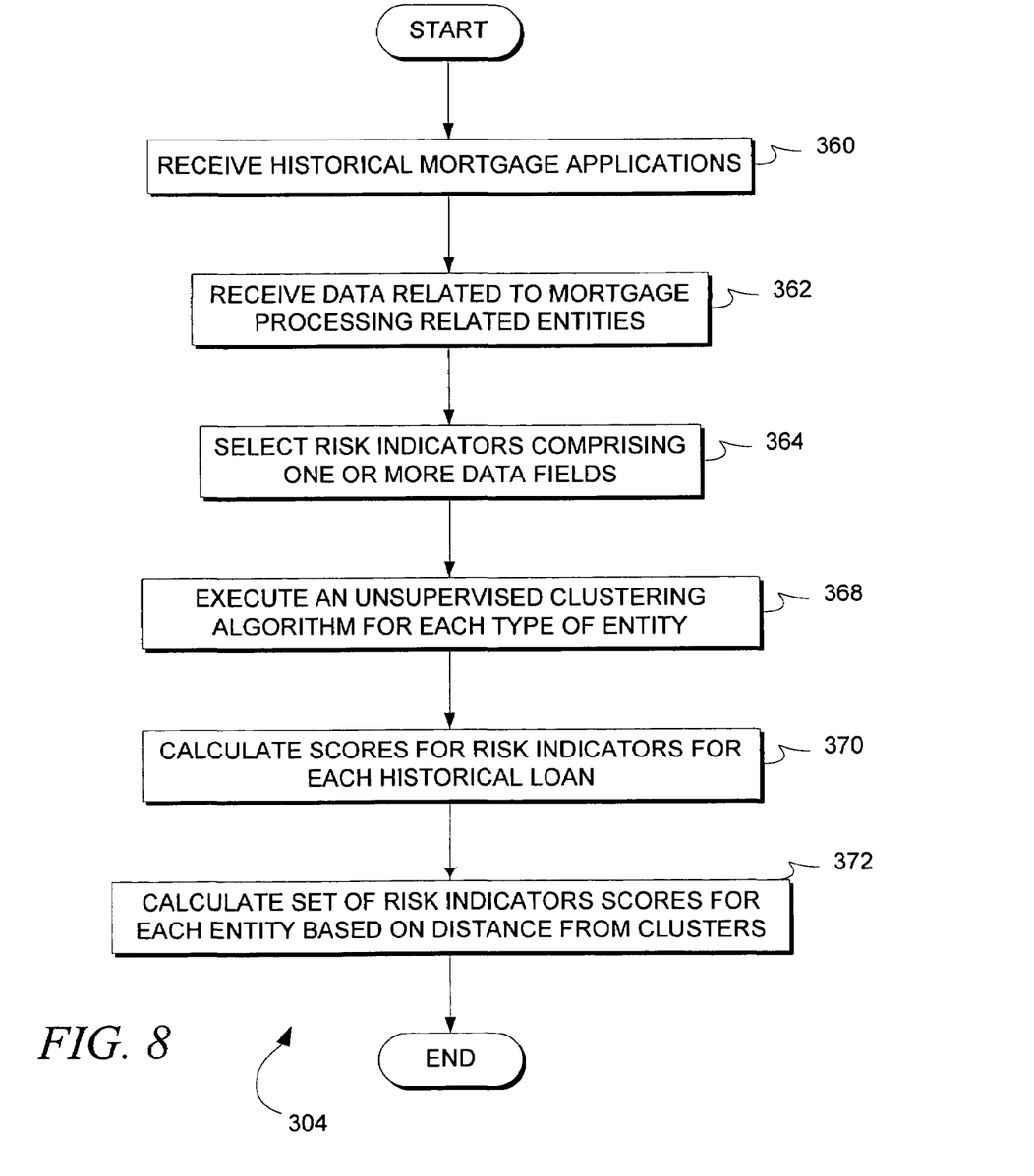
FIG. 8 is a flowchart illustrating an example of generating entity models in the fraud detection system of FIG. 2.

FIG. 8 is a flowchart illustrating an example of a method of performing the block 304 of FIG. 5 of generating entity models 140 in the fraud detection system 100. The method 304 begins at a block 360 in which the model generator 110 receives historical mortgage applications. The model generator 110 may perform various processing functions such as described above with reference to the block 340 of FIG. 7. Next at a block 362, the model generator 110 receives data related to mortgage processing related entities such as an account executive, a broker, a loan officer, or an appraiser. Moving to a block 364, the model generator 110 selects risk indicators comprising one or more of the input data fields. In one embodiment, expert input is used to select the risk indicators for each type of entity to be modeled. In other embodiments, data driven techniques such as data mining are used to identify risk indicators.

Next at a block 368, the model generator 110 performs an unsupervised clustering algorithm such as k-means for each risk indicator for each type of entity. Moving to a block 370, the model generator 110 calculates scores for risk indicators for each received historical loan based on the data distance from data clusters identified by the clustering algorithm. For example, in a simple one cluster model where the data is distributed in a normal or Gaussian distribution, the distance may be a distance from the mean value. The distance/score may be adjusted based on the distribution of data for the risk indicator, e.g., based on the standard deviation in a simple normal distribution. Moving to a block 372, scores for each risk indicator and each entity are calculated based on model, such as a weighted average of each of the applications associated with each entity. Other embodiments may use other models.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A computerized method of detecting fraud, the method comprising:
   receiving mortgage data associated with an applicant and at least one entity related to processing of the mortgage data;
   applying, on at least one processor, the mortgage data to a first model that is based on data from a plurality of historical mortgage transactions associated with the at least one entity,
   wherein the first model includes at least one cluster associated with the plurality of historical mortgage transactions of the at least one entity,
   wherein the at least one cluster is based at least in part on respective data values of at least one data field of each of the plurality of historical mortgage transactions associated with the at least one entity, and
   wherein applying the mortgage data to a first model on the at least one processor comprises comparing at least a portion of the mortgage data with the at least one cluster;
   determining, on the least one processor, a first score based at least partly on a result of applying the mortgage data to the first model;
   generating, on the at least one processor, a report comprising at least one of a score or risk indicator indicative of fraud based at least partly on the first score; and
   outputting the report.

2. The method of claim 1, wherein the mortgage data comprises at least one of mortgage application data, funded mortgage data, or bid tapes.

3. The method of claim 1, wherein the plurality of historical mortgage transactions comprise a plurality of historical mortgage applications.

4. The method of claim 1, further comprising determining a second score for the mortgage data based at least partly on a second model that is based on data from a plurality of historical mortgage transactions, wherein generating the report is performed based at least partly on the second score.

5. The method of claim 1, wherein the first model comprises at least one of neural network, logistic regression, linear regression, decision trees, a classification and regression tree (CART) model, or an expert system.

6. The method of claim 4, wherein said second model is configured to generate the at least one risk indicator of fraud.

7. The method of claim 1, wherein comparing the at least a portion of the mortgage data with the at least one cluster comprises determining a data distance between at least one value of at least one field of the mortgage data and at least one value of the at least one cluster that is associated with the at least one entity, wherein said at least one field of the mortgage data corresponds to the at least one data field on which the cluster is based, and wherein determining the first score is based at least in part on the data distance.

8. The method of claim 1, wherein the at least one entity is at least one of an account executive, a broker, a loan officer, or an appraiser.

9. The method of claim 1, wherein generating the report comprises generating the at least one risk indicator, which is associated with at least one of the mortgage application or data of the at least one entity.

10. The method of claim 1, wherein the report comprises data indicative of fraud by at least one of an account executive, a broker, a loan officer, an appraiser, the applicant, or a lender.

11. The method of claim 1, wherein the mortgage data comprises at least one of: data indicative of at least one person associated with a mortgage application, data indicative of the income of a mortgage applicant, and data indicative of a property subject to a mortgage transaction.

12. The method of claim 1, further comprising selecting an application associated with the mortgage data for further review based on the report.

13. The method of claim 1, wherein generating the report is performed substantially in real time.

14. The method of claim 1, wherein generating the report is performed in a batch mode.

15. A system for detecting fraud, the system comprising:
   a storage configured to receive mortgage data associated with an applicant and at least one entity related to processing of the mortgage application; and
   a processor configured to apply the mortgage data to a first model that is based on data from a plurality of historical mortgage transactions associated with the at least one entity,
   wherein the applied first model includes at least one cluster associated with the plurality of historical mortgage transactions of the at least one entity and
   wherein the at least one cluster is based at least in part on respective data values of at least one data field of each of the plurality of historical mortgage transactions associated with the at least one entity, and
   wherein to apply the mortgage data to a first model, the processor is configured to compare at least a portion of the mortgage data with the at least one cluster;

wherein the processor is further configured to:
    determine a first score based at least partly on a result of applying the mortgage data to the first model;
    generate data indicative of fraud based at least partly on the first score; and
    output the data indicative of fraud.

16. The system of claim 15, wherein the mortgage data comprises at least one of mortgage application data, funded mortgage data, or bid tapes.

17. The system of claim 15, wherein the plurality of historical mortgage transactions comprise a plurality of historical mortgage applications.

18. The system of claim 15, wherein said processor is further configured to determine a second score for the mortgage data based at least partly on a second model that is based on data from a plurality of historical mortgage transactions, wherein generating data indicative of fraud is performed based at least partly on the second score.

19. The system of claim 18, wherein the processor is configured to generate at least one risk indicator of fraud based on said second model.

20. The system of claim 15, wherein the processor determines the first score at least in part based on a data distance between at least one value of at least one field of the mortgage data and at least one value of the at least one cluster that is associated with the at least one entity, wherein said at least one field of the mortgage data corresponds to the at least one data field on which the cluster is based.

21. The system of claim 15, wherein the processor generates data indicative of fraud at least partly by generating at least one risk indicator associated with at least one of the mortgage data or the data of at least one entity.

22. The system of claim 15, wherein the processor is further configured to select an application associated with the mortgage data for further review based at least partly on the data indicative of fraud.

23. The system of claim 15, wherein the processor is further configured to generate the data indicative of fraud substantially in real time.

24. The system of claim 15, wherein the processor is further configured to generate the data indicative of fraud in a batch mode.

25. The system of claim 15, further comprising:
    at least one processor configured to:
        generate a first model based on data from a plurality of mortgage transactions, wherein each of the mortgage transactions is associated with an applicant and at least one entity related to processing of the mortgage transaction; and
        generate a second model based on data from a plurality of historical mortgage transactions associated with the at least one entity; and
    a storage configured to:
        store the first model in a first computer readable medium; and
        store the second model in a second computer readable medium.

26. A system for detecting fraud, the system comprising:
    means for storing mortgage data associated with an applicant and at least one entity related to processing of the mortgage data; and
    means for electronically processing the stored data, said processing means comprising:
        means for applying the mortgage data to a first model that is based on data from a plurality of historical mortgage transactions associated with the at least one entity and determining a first score based at least partly on a result of applying the mortgage data to the first model,
        wherein the first model includes at least one cluster associated with the plurality of historical mortgage transactions of the at least one entity,
        wherein the at least one cluster is based on respective data values of at least one data field of each of the plurality of historical mortgage transactions associated with the at least one entity, and
        wherein applying the mortgage data to a first model comprises comparing at least a portion of the mortgage data with the at least one cluster; and
        means for generating data indicative of fraud based at least partly on the first score and outputting the data indicative of fraud.

27. The system of claim 26, further comprising means for determining a second score for the mortgage data based at least partly on a second model that is based on data from a plurality of historical mortgage transactions, wherein generating data indicative of fraud is performed based at least partly on the second score.

28. The system of claim 27, further comprising means for generating at least one risk indicator of fraud based on said second model.

29. The system of claim 26, wherein the means for generating data indicative of fraud generates the data at least partly by generating at least one risk indicator associated with the data of at least one of: the mortgage transaction or the at least one entity.

30. The system of claim 26, further comprising means for selecting an application associated with the mortgage data for further review based at least partly on the data indicative of fraud.

31. The system of claim 26, further comprising:
    means for generating a first model based on data from a plurality of mortgage transactions, wherein each of the mortgage transactions is associated with an applicant and at least one entity related to processing of the mortgage transaction; and
    means for generating a second model based on data from a plurality of historical mortgage transactions associated with the at least one entity;
    means for storing the first model in a first computer readable medium; and
    means for storing the second model in a second computer readable medium.

32. A computerized method of generating models for detecting fraud, the method comprising:
    receiving data indicative of a plurality of historical mortgage transactions
    receiving data identifying a first portion of the historical mortgage transactions as having been fraudulent; and
    identifying a second portion of the historical mortgage transactions as having been non-fraudulent;
    executing a machine learning program on at least one processor to generate a first model based on data from a plurality of mortgage transactions, wherein each of the mortgage transactions is associated with an applicant and at least one entity related to processing of the mortgage transaction based on the data identifying the transactions as fraudulent and non-fraudulent and based on the data indicative of the historical mortgage transactions;
    storing the first model in a first computer readable medium;
    executing a machine learning program on the at least one processor to generate a second model based on data indicative of a portion of the received plurality of historical mortgage transactions associated with the at least one entity, wherein executing the machine learning program on the at least one processor to generate the second model comprises determining on the at least one processor at least one cluster and at least one value of the cluster associated with the at least one entity, wherein the at least one cluster is determined based on respective data values of at least one data field of each of the portion of the plurality of historical mortgage transactions associated with the at least one entity; and storing the second model in a second computer readable medium.

33. The method of claim 32, wherein the supervised learning program comprises a neural network.

34. The method of claim 32, wherein executing a machine learning program to generate the second model comprises:

identifying at least one cluster in the data indicative of the portion of the plurality of historical mortgage transactions associated with the at least one entity.

35. The method of claim 32, wherein identifying the at least one cluster comprises performing a k-means algorithm.

36. The method of claim 32, wherein generating one of the first and second models is performed substantially in real time.

37. The method of claim 32, wherein generating one of the first and second models is performed periodically in a batch mode.

38. The method of claim 1, wherein the risk indicator comprises at least one of an explanation or recommendation for action.

39. The system of claim 15, wherein the processor is configured to output a report that includes at least one of a score and a risk indicator.

* * * * *